United States Patent [19]

Rodemer

[11] 4,296,777
[45] Oct. 27, 1981

[54] MULTIPLE COUPLING FOR LUBRICATING SYSTEMS

[75] Inventor: Karl Rodemer, Heidelberg, Fed. Rep. of Germany

[73] Assignee: Lincoln-Helios GmbH, Walldorf, Fed. Rep. of Germany

[21] Appl. No.: 49,843

[22] Filed: Jun. 18, 1979

[30] Foreign Application Priority Data

Jun. 21, 1978 [DE] Fed. Rep. of Germany ....... 2827137

[51] Int. Cl.$^3$ .................... B60R 17/00; F16L 29/00
[52] U.S. Cl. ................................ 137/351; 137/269; 137/594; 137/798; 137/866; 137/871; 280/421
[58] Field of Search ............. 137/269, 351, 594, 798, 137/871, 866; 280/421

[56] References Cited

U.S. PATENT DOCUMENTS 2,359,648 10/1944 Jones .................................. 137/594
2,922,662 1/1960 Hall .................................... 137/351
3,918,485 11/1975 Weber .

FOREIGN PATENT DOCUMENTS 1937544 4/1966 Fed. Rep. of Germany .
2059576 8/1972 Fed. Rep. of Germany .
7230420 2/1973 Fed. Rep. of Germany .

Primary Examiner—Gerald A. Michalsky
Attorney, Agent, or Firm—Jim Zegeer

[57] ABSTRACT

The invention relates to a multiple coupling for lubricating systems, preferably progressive lubricating systems of motor vehicles, especially tractor trailer units. The multiple coupling a plug box and a plug, with the help of which several lubrication pipes may be interconnected. In order that the plug box-plug-combination may be used for variable number of lubrication pipes, a special valve arrangement has been provided with the help of which the desired number of passages of lubrication pipes is opened or closed.

13 Claims, 1 Drawing Figure

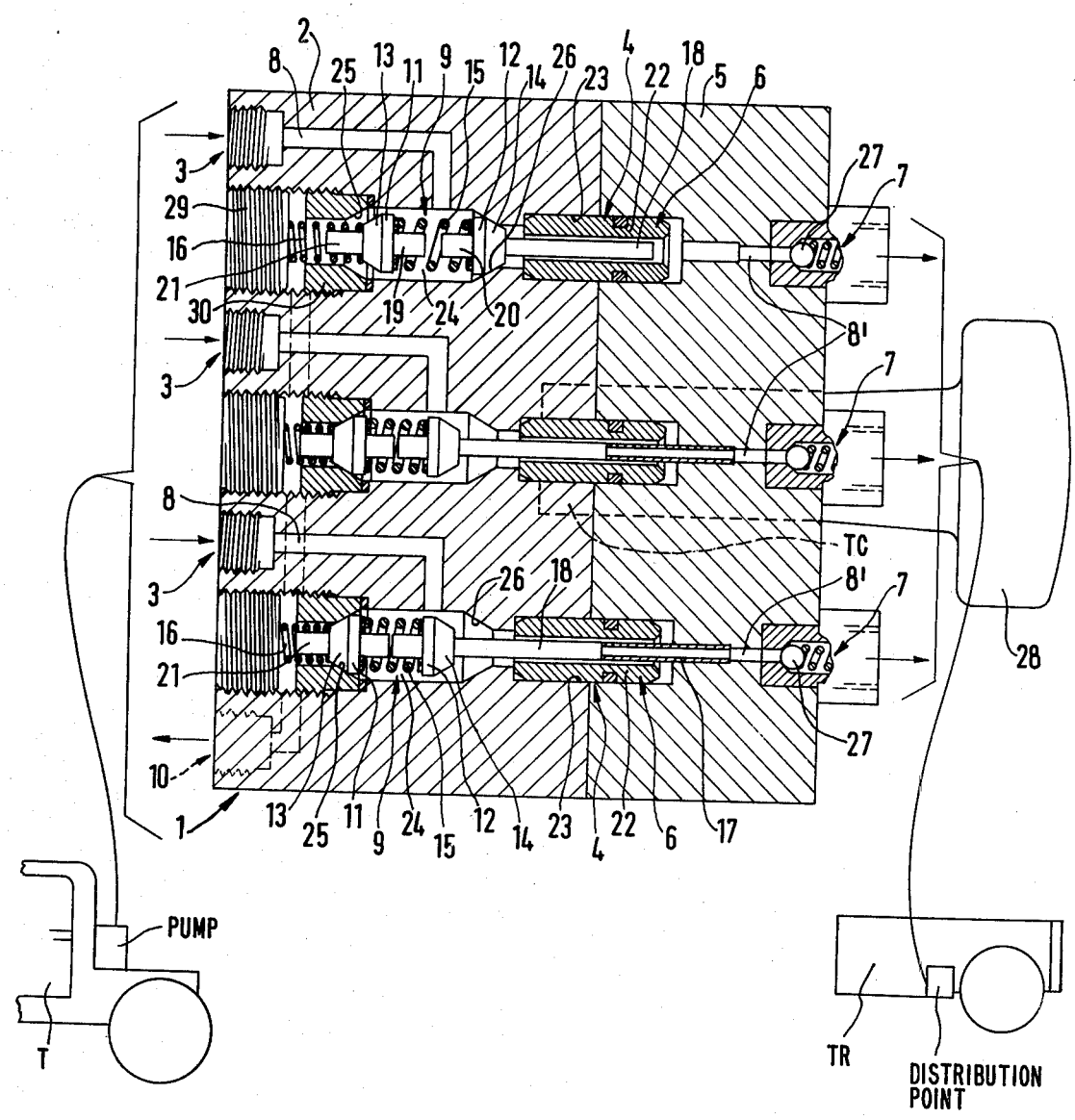

MULTIPLE COUPLING FOR LUBRICATING SYSTEMS

The invention relates to a multiple coupling for lubricating systems, particularly progressive lubricating systems for motor vehicles, expecially tractor-trailer units.

BACKGROUND AND BRIEF DESCRIPTION OF THE INVENTION

In the case of motor vehicles, especially or tractor-trailer units all lubricating points both on the tractor as well as on the trailer are supplied with lubricant from one supply pump, customarily located on the tractor. Whenever a customary progressive lubricating system with series connected distributors or distributor pistons is used for this purpose, then lubrication pipe transfers from the tractor to the trailer are needed in a number which corresponds to the number of the lubricant distributors on the trailer. In case of the progressive lubrication system, the passage of lubricant of all pipes is blocked in case one lubrication pipe is locked. Depending on the design the trailer nowadays contains one, two or more lubricant distributors.

The object of the present invention is to provide a multiple coupling of the type which may be used for connection of trailers with variable numbers of lubrication points in the trailer, i.e., which permits the connection of trailers with variable members of lubrication points, with the same tractor.

This task is solved according to the invention by providing a plug box connected to a source of lubricant under pressure and at least two outlets, a plug in piece which has at least two inlets corresponding to the outlets of the plug boxes and at least two passages to remote lubrication points corresponding to the number of remote lubricant distributors. A connecting passageway between the inlet of the plug box and the passage to the remote lubrication point of the plug in piece, always one value arrangement is provided which selectively opens one of the passages of the lubricant from the plug in piece, or (2) to a return of the plug box. The principle of solution is that multiple coupling will just always open as many lubrication passages, as there are lubrication points or lubrication distributors in the trailer, while the lubricant of the blocked coupling passages is returned to the supply pump. If, therefore one has for example a multiple coupling with three possible passages, but the trailer has only two lubrication points or lubricant distributors, then one passage is closed with the valve arrangement provided according to the invention and the latter is coupled with the return to the supply pump. One proceeds correspondingly, with two of the passages, whenever a trailer with for example only one lubrication point or one lubricant distributor is to be connected with the tractor with a multiple coupling which has three possible passages.

An easily constructed and particularly simple development of the valve arrangement in which the valve arrangement has a double piston arrangement which in a first terminal position closes the passage from the pertinent plug box inlet to the pertinent plug-in piece passage to the remote lubrication point, and opens the passage from the pertinent plug box inlet to the return, and in its other terminal position inversely opens the passage from the pertinent plug box inlet to the pertinent plug in piece passage to the remote lubrication point and closes the passage from the pertinent plug box inlet to the return. This will guarantee—while functioning securely—that either a flow through to the one or several lubrication point(s) or the one or several lubricant distributor(s) in the trailer or a return of the lubricant to the supply pump, is possible. The double piston arrangement has two pistons mutually supported by means of a first spring with outward-facing sealing surfaces, which pistons are pressed jointly by a second spring in the direction of the first terminal position.

Furthermore, the double piston arrangement is disposed in a chamber which forms at its terminal surfaces the sealing seats for the sealing surface of the pistons whereby the inlet of the plug box is connected by way of the connecting pipe with the chamber between the two sealing seats and whereby the connecting pipe starts from the one terminal surface of the chamber to the escape passages to the remote lubrication distributor point of the plug-in piece and the return starts from the other terminal surface of the chamber. This structure has the advantage of providing a simple insertion of the valve arrangement into the plug box.

This double piston arrangement is shiftable by means of a rod insertable into the connecting pipe, during the plugging together of plug box and plug-in piece counter to the pressure of the second spring from the first terminal position into the second terminal position. In this way the selection of the open or closed connecting pipes by insertion or removal of corresponding rods into the plug-in piece, which is to be assigned to a trailer with a corresponding number of lubrication points, is possible.

Thus, one and the same multiple coupling may be adapted by insertion of one or several pegs into the plug-in piece to the corresponding number of lubrication points or lubricant distributors of the trailer without any constructional changes. The one piston of the double piston arrangement guaranteeing the closing of the passage from the plug box inlet to the outlet passage to the remote lubrication points of the plug-in piece, projects with an extension—on which a pin may act—into the connecting pipe or passage to thus provide a particularly simple and forced action of the rods on the valve arrangement in the plug box is guaranteed.

The pistons of the double piston arrangement always have extensions facing each other, on which the first spring is seated so the pistons of the double piston arrangement are kept in the required alignment for the reciprocal movement in the chamber. The other piston guaranteeing the closing of the passage from the inlet of the plug box to the return, carries an outside extension on which the second spring is disposed. This arrangement guaranties the cantfree guidance of the piston arrangement in the chamber and of the position extension in the connecting pipe or passageway.

These casings serve for the firm plugging in of the plug-in piece into the plug box and they additionally guarantee the support always of the rods used as well as the guiding of the piston extension. Also, non return valves have been provided in the outlet passages to the remote distribution points of the plug in pieces as that during pulling out of the plug-in piece from the plug-in box the lubricant would not flow out of the lubrication pipes of the trailer.

Finally, plug-box and plug-in piece may be releaseably coupled with one another by means of a hand-operated threaded connection which guarantee the firm but releasable coupling of the plug-in piece with the plug box.

Additional characteristics, advantages and possibilities of application of the present invention will result from the succeeding description of an embodiment on the basis of the attached drawing.

The single FIGURE illustrates in section a multiple coupling of the invention with three possible passages.

The multiple coupling 1 of the invention, will be described in relation to motor vehicle lubricating systems, and especially in regards to a tractor trailer wherein a plug-box 2, customarily disposed on the tractor, T and which also carries the lubrication pump, and of a plug-in piece 5 fitting said box, which is customarily assigned to the trailer TR. The plug box 2, in the case shown, has three inlets 3, corresponding to the number of possible passages, which are connected with outlets 4 of the plug box 2, via pertinent connecting pipes or passageways 8. The plug-in piece 5 on its part, has three inlets 6 corresponding to the plug box outlets 4, which are connected via connecting pipes or passageways 8' with the corresponding outlet passageways 7 to the remote lubrication points of the plug-in piece 5. Lubrication pipes lead from the outlet passageways 7 to the lubricating points or lubricant distributors in the trailer of the tractor-trailer unit, provided in corresponding number, therefore one, two or three such lubrication pipes.

The pertinent connecting pipes or passageways 8 of the plug box 2 leads from the pertinent plug-box inlets 3, always into one axial, say cylindrical chamber 24, at one terminal surface of which, facing away from the plug-in piece 5 a sealing seat 25, and on the other terminal surface of which facing the plug-in piece 5, a sealing seat 26 is provided for to mutually aligned pistons 11 and 12 pointing outward with their sealing surfaces 13 and 14. The connecting pipe or passageway 8 leads laterally between the pistons 11 and 12 into the chamber 24, and goes off again from the latter in axial direction at the terminal surface facing the plug-in piece 5.

The pistons 11 and 12 form a double piston arrangement of a valve arrangement 9, disposed in the pertinent connecting pipes or passageways 8, 8', which either closes, depending on its axial terminal position, the passage from the pertinent plug box inlet 3 to the pertinent plug-in piece outlet passageway to the remote lubrication point 7 and simultaneously opens the passage from the pertinent plug box inlet 3 to a joint return 10, or else, whenever the double piston arrangement 11, 12 is in the terminal position facing away from the plug-in piece 5, opens the passage from the plug box inlet 3 to the plug-in piece outlet passageway to the remote lubrication point 7 and, at the same time closes the passage from the pertinent plug box inlet 3 to the return 10. The two pistons 11 and 12 are mutually supported by way of a spiral spring 15, which is pushed over extensions 19 and 20 facing each other, of the pistons 11 and 12. The double piston arrangement 11, 12 is pressed together, normally by a spiral spring 16 which is pushed over an outside extension 21 of the piston 11 and is supported by a closing body 29 of the plug-box housing, into the terminal position adjacent to the plug-in piece 5, in which the piston 12 fits with its sealing surface 14 against the slanting sealing seat 26 of the chamber 24. In this terminal position of the double piston arrangement 11, 13, the passage from the plug-box inlet 3 to the plug-in piece outlet to the lubrication or distribution point 7 is closed, simultaneously however, the piston 11 with its sealing surface 13 is lifted off the sealing seal 25, so that the passage from the plug-box inlet 3 by way of the connecting pipe or passageway 8 and the chamber 24 to the joint return 10, is open.

The sealing surface 25, in correspondence with the illustration is provided on a casing shaped insert element 30, screwed into the continuous bore, forming a recess 23 in the area of the plug-box outlet 4 and a part of the return 10, the chamber 24, a part of the connecting pipe or passageway 8 in continuation of the chamber 24, said insert element having a continuous bore, in which lies the spring 16 and into which the piston 11 projects with the extension 21. The insert element 30 has been enlarged as compared to the cross section of the chamber 24, so that the double piston arrangement 11, 12 may be disposed in the chamber 24, prior to the screwing in of the insert element 30 and the insertion of the closing body 29. The double piston arrangement 11, 12, as shown in case of the two lower passages in the drawing, is moved from the standard (right-hand) terminal position into the opposite terminal position in chamber 24, whenever before putting together of plug-box 2 with the plug-in piece 5, which in the area of its inlets 6 always carries casings 22, which with their outward pointing ends are inserted into the corresponding recesses 23 in the area of the plug-box outlets 4, rods 17 are inserted into the connecting pipe 8' of the plug-in piece 5, and thus press the double piston arrangement 11, 12 counter to the force of the springs 15 and 16 into the (left-hand) opposite terminal position, in which the piston 11 fits against the assigned sealing surface 25 and blocks the passage of the lubricant from the plug box inlet 3 to the return 10, on the other hand however, the piston 12 with its sealing surface 14 is lifted off the assigned sealing seat 25, so that the passage of the lubricant from the plug-box inlet 3 to the plug-in outlet passage 7 is open. The rods 17 are always inserted in adaptation to the number of lubrication points of the trailer, into those connecting pipes 8' of the plug-in piece 5, in case of which the passage for the lubricant is to be opened, whereas in the case of plug-in piece outlet passages 7, which are not to be supplied with lubricant, the insertion of the rod 17 is omitted, as illustrated in case of the continuous bore, being the top one in the drawing. Therefore, by plugging in the parts of the multiple coupling 1, those bores or passages will then per force be opened (and the corresponding returns closed), which are to be supplied with lubricant.

When disassembling the parts of the multiple coupling 1, the double piston arrangement 11, 12 is automatically again forced into the (right-hand) closing position, the plug-box 2 therefore is closed outward against escape of lubricant. In order to prevent a return of the lubricant from the lubrication pipes of the trailer, always one non-return valve 27 is disposed in the area of the plug-in piece outlet passages 7. The coupling and uncoupling of the plug-box 2 with the plug-in piece 5 is accomplished via a thread connection TC operable from the handle 28.

The multiple coupling of the invention, which is shown in the drawing thus illustrated for example on the basis of the arrangement of the two rods 17, a case, in which two lubricating points or lubricant distributors are to be supplied in the trailer of the tractor-trailer unit. Obviously the number of the rods 17 used may be varied between one and three arbitrarily and also the point of their arrangement. Also, the multiple coupling 1 of the invention is not limited to the case of three bores of passage. There may also be two or more than three bores of passage with correspondingly selectable opening of the supply of lubricant or return of the lubricant to the supply pump being provided.

While there has been shown and described a preferred embodiment of the invention it will be obvious to those skilled in the art that various changes and modifications can be carried out without departing from the spirit and scope of the invention as set forth in the following claims:

What is claimed is:

1. Multiple coupling for progressive lubricating systems comprising a plug box, said plug box having at least one inlet and at least one return connected with a lubrication pump, and at least two outlets, and with a plug-in piece which has at least two inlets corresponding to the outlets of said plug box and at least two escapes, assigned to its own inlets, to a corresponding number of remote lubricant distributors, the improvement comprising means forming a connecting passageway between the inlet of the plug box and the escape of the plug-in piece, said connecting passageway including a valve arrangement which selectively opens the passage of the lubricant (1) from said plug box inlet to said escape of said plug-in piece, or (2) to said return of said plug box.

2. The invention defined in claim 1 wherein said progressive lubrication system is on a tractor-trailer motor vehicle unit, said lubricaton pump being located on the tractor of said tractor trailer and said remote lubrication distributors being located on the trailer of said tractor trailer unit.

3. The multiple coupling as defined in claim 1, wherein said valve arrangement has a double piston arrangement which in a first terminal position closes the passage from the pertinent plug box inlet to the pertinent plug-in piece escape, and opens the passage from the pertinent plug box inlet to the return, and in its other terminal position inversely opens the passage from the pertinent plug box inlet to the pertinent plug in piece escape and closes the passage from the pertinent plug box inlet to the return.

4. The multiple coupling as in claim 3 characterized in that the double piston arrangement has two pistons mutually supported by means of a first spring, with outward-facing sealing surfaces, which pistons are pressed jointly by a second spring in the direction of the first terminal position.

5. Multiple coupling as in claim 4, wherein said double piston arrangement is disposed in a chamber which forms at its terminal surfaces the sealing seats for the sealing surfaces of the pistons whereby the inlet of the plug box is connected by way of said connecting passageway with the chamber (24) between the two sealing seats and whereby the connecting passageway starts from the one terminal surface of the chamber to the escape of the plug-in piece and the return starts from the other terminal surface of the chamber.

6. The multiple coupling as defined in claim 5 including a spring biased rod coupled to said double piston arrangement for shifting same in said chamber, being inserted into said connecting passageway during the plugging together of said plug box and said plug-in piece counter to the pressure of the spring biasing said rod from the first terminal position into the second terminal position.

7. The multiple coupling as defined in claim 6, one of said pistons of said double piston arrangement guarantees the closing of said passage from the plug box inlet to the outlet of said plug-in piece, projects with an extension on which said rod may act—into said connecting passageway.

8. The multiple coupling as defined in claim 7 wherein said pistons of said double piston arrangement have extensions facing each other, on which the said first springs are seated.

9. The multiple coupling as defined in claim 8 wherein one of the pistons of said double piston arrangement guarantees the closing of the passage from said inlet of said plug box to said return, and carries an outside extension on which said second spring is disposed.

10. The multiple coupling as defined in claim 9 including a casing inserted into each said outlet of said plug box, said casings fit with their ends projecting from the plug box into said inlets of said plug-in piece and serve as support for said rods and as a guide for the said extensions of the pistons.

11. The multiple couplings as defined in claim 10 including non-return valves in said outlets of said plug-in pieces.

12. The multiple coupling as defined in claim 11 wherein said plug-box and said plug-in piece are releasably coupled with one another by means of a hand-operated threaded connection.

13. Liquid coupling apparatus for coupling a liquid under pressure from a source to a utilization device comprising in combination, a plug box, said plug box having means forming an inlet passageway adapted to be connected to said source of liquid, means forming a return passageway to said source of liquid, means forming an outlet passageway, a valve chamber in said plug box forming a connecting passageway between said inlet passageway, said return passageway and said outlet passageway, valve seat means formed at the entrance to each of said return passageway and said outlet passageway, a pair of piston valve elements in said valve chamber, each piston valve element assigned and adapted to seat on one of said valve seats, respectively, a first compression spring between said piston valve elements, a second compression spring biasing both said valve elements in a direction to seat the valve element associated with the valve seat at said outlet passageway, an extension member on the piston valve element associated with said outlet passageway, a plug-in piece coupled to said utilization device and having an inlet passageway corresponding and adapted to be aligned with said outlet passageway, a valve actuator member forming an extension of said plug-in piece at said inlet passageway and adapted, when said plug-in piece is mated with said plug box, to engage said extension member and unseat the valve element associated with said outlet valve seat and, through said first compression spring, seat the said piston valve element on the valve seat associated with said return passageway.

* * * * *